(12) United States Patent
Shlomi (10) Patent No.: US 8,503,744 B2
(45) Date of Patent: Aug. 6, 2013

(54) DYNAMIC METHOD AND SYSTEM FOR REPRESENTING A THREE DIMENSIONAL OBJECT NAVIGATED FROM WITHIN

(76) Inventor: Dekel Shlomi, Petah Tikwa (IL)

( * ) Notice: Subject to any disclaimer, the term of this patent is extended or adjusted under 35 U.S.C. 154(b) by 491 days.

(21) Appl. No.: 12/734,622

(22) PCT Filed: Nov. 19, 2008

(86) PCT No.: PCT/IL2008/001516
§ 371 (c)(1),
(2), (4) Date: May 12, 2010

(87) PCT Pub. No.: WO2009/066285
PCT Pub. Date: May 28, 2009

(65) Prior Publication Data
US 2010/0266172 A1 Oct. 21, 2010

Related U.S. Application Data

(60) Provisional application No. 60/996,456, filed on Nov. 19, 2007.

(51) Int. Cl.
*G06K 9/00* (2006.01)

(52) U.S. Cl.
USPC ......................................................... 382/128

(58) Field of Classification Search
None
See application file for complete search history.

(56) References Cited

U.S. PATENT DOCUMENTS

| | | |
|---|---|---|
| 2004/0254437 A1 | 12/2004 | Hauck et al. |
| 2006/0149134 A1 | 7/2006 | Soper et al. |
| 2007/0225558 A1 | 9/2007 | Hauck et al. |
| 2008/0077158 A1 | 3/2008 | Haider et al. |
| 2008/0205757 A1* | 8/2008 | Von Berg et al. ............. 382/173 |
| 2010/0135550 A1* | 6/2010 | Arnon ........................... 382/128 |

OTHER PUBLICATIONS

Helferty, J.P.; Higgins, W.E.; , "Combined endoscopic video tracking and virtual 3D CT registration for surgical guidance," Image Processing. 2002. Proceedings. 2002 International Conference on, vol. 2, no., pp. II-961-II-964 vol. 2, 2002 doi: 10.1109/ICIP.2002.1040112.*

* cited by examiner

*Primary Examiner* — Nirav G Patel (57) ABSTRACT

A system and method for presenting a navigable view of a virtual model of a three dimensional object comprising a virtual three dimensional topographic framework and at least one visual representation of an internal region of the object imaged within a sample of the object. The visual representation is superimposed upon a view of the three dimensional topographic framework at a location corresponding to the internal region of the sample. In preferred embodiments, the three dimensional object comprises an anatomical specimen.

18 Claims, 3 Drawing Sheets

DYNAMIC METHOD AND SYSTEM FOR REPRESENTING A THREE DIMENSIONAL OBJECT NAVIGATED FROM WITHIN

FIELD OF THE INVENTION

The present invention is directed to providing a virtual three dimensional representation of a body. More specifically, the present invention is directed to providing a three dimensional navigable environment representing the inside of bodies, such as anatomical bodies and the like.

BACKGROUND

In the tradition of physical anatomical models, computer models can be used to represent the form and function of anatomical features. A virtual model of the anatomy could be stored in a computer and displayed on a visual display unit, i.e. a screen.

Anatomical models are sometimes used as surgical aids. For example, United States Patent Application No. 2008/0077158 to Hider and Barrera, "Method and apparatus for computer aided surgery", describes a surgical suite for computer aided surgery which incorporates the use of a virtual model of a portion of the patient upon which a procedure is to be performed. A three dimensional model of the relevant portion of the patient is produced before surgery using CT scans, MRI scans and/or other techniques. The patient model is then used by the surgeon prior to surgery to evaluate the strategy for proceeding with the actual procedure and may be used to guide the surgeon during the surgical procedure itself.

Another computer model, used in surgical applications, is described in United States Patent Application No. 2006/0149134 to Soper et al., titled "Catheterscope 3D guidance and interface system". In Soper's system, a 3-D graphical model of the airway is generated from image reconstruction, which is used to guide an ultra-thin flexible endoscope to a predetermined region within a lung during a bronchoscopy procedure. The visual display includes windows depicting a virtual fly-through perspective and real-time video images acquired at the head of the endoscope, which can be stored as data.

These systems are directed towards aiding a skilled surgeon with an already detailed knowledge of anatomy. Without a good knowledge of anatomy, the output displayed by such systems is difficult to interpret. The context of the anatomical features shown is not generally presented and it is thus difficult for the untrained viewer to comprehend what is shown. Such systems have limited use for teaching physiology and anatomy, and are unsuitable for explaining to the patient or the patient's carers what is shown.

There is a need for a computer based virtual anatomical model which is more easily interpreted by even untrained users, and embodiments of the present invention addresses this need.

SUMMARY OF THE INVENTION

It is an aim of one embodiment of the invention to provide a virtual model of a three dimensional object comprising a virtual three dimensional topographic framework and at least one visual representation of an internal region imaged within a sample of the object; wherein the visual representation is superimposed upon a view of the three dimensional topographic framework at a location corresponding to the internal region of the sample.

In preferred embodiments, the three dimensional object comprises an anatomical specimen. Typically the three dimensional object comprises a human body. Alternatively, the three dimensional object is selected from the group comprising: plants, animals, buildings, tunnel systems, underground bunker networks, pipes, water works, sewage systems, nests, warrens, mechanical systems and vehicles.

It is a further aim of embodiments of the invention to provide a system for presenting a view of a virtual model of a three dimensional object, the system comprising: at least one database comprising a first set of data files representing an interior view of at least one specimen and a second set of data files representing an exterior view of at least one specimen; a framework generator for constructing a virtual three dimensional framework from the second set of data files; an image selector for selecting at least one the interior view; a merger for combining at least one selected interior view with the three dimensional framework thereby producing the virtual model; and an output display for displaying the view of the virtual model. Optionally, the system presents a view of an anatomical specimen, typically human or animal.

It is an aim of another embodiment of the invention, to present a virtual anatomical model comprising a virtual three dimensional framework representing an anatomical specimen and at least one visual representation of a region of a sample specimen; wherein the visual representation is superimposed upon a view of the three dimensional framework at a location corresponding to the region of the sample specimen. Preferably, the virtual model comprises a combination of at least a first set of data files obtained using non-invasive imaging techniques and a second set of data files obtained using invasive imaging techniques.

Optionally, the non-invasive imaging technique is selected from a group comprising: external photography, x-ray, ultrasound, MRI, CT scanning isotope study, echocardiography, positron emission tomography.

In various embodiments, the invasive imaging technique is selected from a group comprising: endoscopic imaging, angiographic imaging, lymphangiographic imaging, and boreoscopic imaging. For example, invasive imaging technique may include any of the techniques selected from a group comprising: esophagogastroduodenoscopy, colonoscopy, proctosigmoidoscopy, endoscopic retrograde cholangiopancreatograpy, duodenoscope-assisted cholangiopancreatoscopy, intraoperative cholangioscopy, rhinoscopy, bronchoscopy, cystoscopy, colposcopy, hysteroscopy, falloscopy, laparoscopy, arthroscopy, thoracoscopy and mediastinoscopy, amnioscopy, fetoscopy, panendoscopy, laryngoscopy, esophagoscopy, and bronchoscopy.

Typically, the visual representation shows a region of the sample specimen which comprises a wall of a cavity, the cavity being selected from a group comprising: physiological cavities, pathologic cavities, airways, blood-vessels, intestines, esophagus, stomach, heart, lymphatic system, genitourinary system, fistula, abscess and surgical incisions.

Preferably, the virtual model comprises a plurality of visual representations corresponding to a common location within the three dimensional framework. Advantageously, the plurality of visual representations represent the common location as it would appear in a plurality of medical states.

Optionally, visual representations are selected from the group comprising: still photographs, videos, histological sections, electron microscopic images and cellular biology imaging.

The virtual three dimensional framework may comprise a mosaic of images obtained from a plurality of sample specimens. Alternatively, the virtual three dimensional framework being a true representation of a single sample specimen. Typically, the specimen comprises a human body.

Preferably, the virtual model further comprises a user interface for controlling the view of the virtual model. Optionally, the view simulates a passage along at least one pathway within the model. Advantageously, the view comprises an endoscopic video stream superimposed upon the pathway. Additionally the view may comprise an animation of the model.

Still a further aim of embodiments of the invention is to teach a method for producing a virtual model of a specimen, the method comprising the steps:
- obtaining a first set of data files using non-invasive imaging techniques;
- obtaining a second set of data files using invasive imaging techniques;
- combining the first set of data files into a three dimensional representation of the specimen;
- selecting at least one visual representation of a region of a sample specimen, and
- superimposing the visual representation upon a view, wherein the three dimensional representation at a location corresponds to the region of the sample specimen.

Another embodiment of the invention aims to teach another method for navigating within a virtual model comprising multiple image sequences, wherein switching from a first image sequence to a second image sequence occurs in a seamless fashion, the method comprising the steps:
- Step (a)—setting an image index l to 1;
- Step (b)—displaying an image $I_{lk}$ of an image sequence Sk;
- Step (c)—searching a matrix $M_{lk}$ for an entry $M_{lk}{}^{ij}$, for which $M_{lk}{}^{ij}=1$, indicating that a view of the 3D space of the image $I_{lk}$ is the same as the view of the image $I_{ij}$, where $I_{ij}$ is an image sequence $S_j$;
- Step (d)—if there are no entries $M_{lk}{}^{ij}=1$, increasing the image index l by 1 either returning to step (b) or terminating the process if $1 \geq L_k$;
- Step (e)—if there are pairs i,j for which $M_{lk}{}^{ij}=1$, displaying a list of all image sequences $S_j$ for which there is a $_i$ such that $M_{lk}{}^{ij}=1$;
- Step (f)—selecting an image sequence $S_j$ with which to continue the navigation;
- Step (g)—setting the sequence index k to the selected j, and
- Step (h)—setting the image index l to i and returning to step (b).

A further aim of another embodiment of the invention is to provide a database comprising at least a first set of data files obtained using non-invasive imaging techniques and a second set of data files obtained using invasive imaging techniques the data files for constructing a virtual model of a three dimensional object.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

Figure 1:
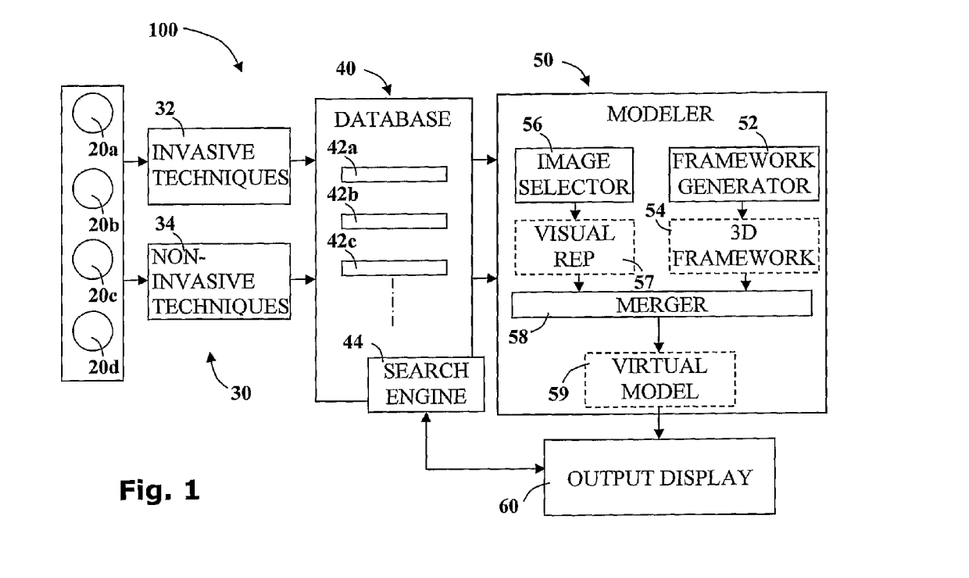
FIG. 1 is a block diagram representing the main features of a system for constructing a virtual anatomical model according to one embodiment of the invention.

Reference is now made to FIG. 1 showing a block diagram of the main features of a system 100, according to a first embodiment of the invention. The system may be used for constructing a virtual anatomical model of a human, although a similar system may be used to produce an anatomical model of other species. The system 100 includes a database 40, a modeler 50 and an output display 60.

The database 40 contains data files 42 acquired by imaging multiple subjects 20 using a plurality of imagers 30. In preferred embodiments, some imagers 30 use invasive techniques 32, such as endoscopy, angioscopy, angiography or the like, and others imagers 30 use non-invasive techniques 34, such as ultrasound, x-ray, computerized tomography (CT), Magnetic Resonance Imaging (MRI), isotope studies amongst others.

The modeler 50 includes a framework generator 52, an image selector 56 and an image merger 58. The framework generator 52 is configured to build a three dimensional anatomical framework (3D framework) 54 using multiple data files 42 from the database. In certain embodiments the 3D framework 54 is constructed from a plurality of data files obtained from a common source 20. Alternatively, data files 42 from multiple sources 20 are mosaiced to produce a single 3D framework 54.

The image selector 56 is provided to select data files 42 from the database 40 where each of which corresponds to a visual representation 57 of a region of a subject 20. The image merger 58 is provided to construct a virtual three dimensional anatomical model 59 by merging at least one visual representation 57 with the 3D framework 54 such that the visual representation 57 is superimposed upon the 3D framework 54 in its anatomically correct context.

The output display 60 is provided to display a view of the virtual model 59 to the user. It is a particular feature of some embodiments of the current invention that the display 60 provides an integrated presentation of anatomical regions in their anatomical context. It will be appreciated that integrated presentations are more easily understood by the unskilled viewer than systems of the prior art such as Soper's "Catheterscope 3D guidance and interface system" described in United States Patent Application No. 2006/0149134 and referenced hereinabove, which provides multiple presentations directed to providing guidance to an expert in anatomy.

Unlike virtual navigation systems in which no external or contextual information is provided to a user navigating an inner space, an important feature of preferred embodiments of the present invention is that images from within a cavity are surrounded by a view of the exterior setting of that cavity. Typically, information obtained by invasive procedures is presented in its correct anatomical context upon a background of information from non-invasive sources. Generally, a single interactive model is created by combining different anatomical structures by the fusion or stitching of complementary images from various sources.

As stated above, such an integrated view is easier to interpret than a collection of separate images. This is of particular benefit for example for a novice or a student unfamiliar with the material. Consequently, in one exemplary application, the view of the virtual model may be directed to the teaching of anatomy.

A teacher may use the presentation to indicate noteworthy details and may easily compare multiple images of similar features. Moreover, a navigable, interactive model is particularly suitable for self-study, remote e-learning and the like, with a student being able to experience a virtual journey through the anatomy for example. In a particular embodiment of the invention, access to the virtual model may be provided via the internet, allowing any user with internet access to search, explore, view and learn the anatomy in an interactive manner.

In another application, a virtual model may be used by a doctor to better inform a patient about a particular medical condition or a medical procedure. Here it may be preferable that the model is at least partially constructed from images obtained by imaging the patient himself, although this may not always be necessary. A clear and visual presentation of the medical facts may enable a patient to make an informed decision regarding treatment options available.

It is noted that the imagers 30 may include a wide variety of instruments as will be apparent to those skilled in medical imaging. Such imagers 30 may include both invasive and non-invasive or minimally invasive techniques. The term invasive refers herein to imaging techniques involving an imaging device being introduced into the body being imaged. The term non-invasive refers herein to any imaging technique in which the imaging device is entirely external to the body being imaged.

Amongst others, non-invasive imaging techniques may include external photography, x-ray, ultrasound, echocardiography, MRI, CT scanning and so on. Other non-invasive techniques include isotope studies, such as radioactive iodine, gallium scans and fluorodeoxyglucose (FDG) in positron emission tomography (PET) for example or specific scans of the heart, lungs and/or other organs or systems.

Invasive imaging techniques may include endoscopic imaging of airways or dietary tracts, angiographic imaging of blood vessels, lymphangiographic imaging of the lymphatic system and boreoscopic imaging techniques for imaging normally inaccessible areas of the body via incisions through the skin. Endoscopic imaging techniques may include fiberoptic endoscopy and/or pill endoscopy.

In various embodiments, the anatomical regions imaged may show anatomical features such as a wall of a body cavity, such as an airway, blood-vessel, intestine, esophagus, or stomach. Accordingly various known imaging techniques may be used, these include: esophagogastroduodenoscopy, colonoscopy, proctosigmoidoscopy, endoscopic retrograde cholangiopancreatograpy (ERCP), duodenoscope-assisted cholangiopancreatoscopy, intraoperative cholangioscopy, rhinoscopy, bronchoscopy, cystoscopy, colposcopy, hysteroscopy, falloscopy, laparoscopy, arthroscopy, thoracoscopy and mediastinoscopy, amnioscopy, fetoscopy, panendoscopy, laryngoscopy, esophagoscopy, and bronchoscopy. Other imaging procedures will occur to practitioners.

The database 40 may comprise a reservoir of files 42 representing various medical imaging studies, such as those listed above. The files 42 may be arranged in a hierarchical system and each linked to a topographic region or voxel within the 3D framework 54. Preferably, each file is edited in a way that it can replace other files linked to the same voxels in order to show the same feature in a variety of physiological or pathological conditions. In this way the user could navigate in areas of healthy tissue or diseased tissue in an interactive way using a library of real medical studies or may activate a simulation of physiologic function or dysfunction. Where a first and second file correspond to a common region, optimally, the image associated with the second file may replace the image associated with the first file in a seamless fashion within the model.

In a particular example a file showing the view of a normal colonoscopy examination is replaced at a user's request with an alternative view of a colonoscopy in which a polyp is found, say, in the lumen of the transverse colon. The user starts the virtual journey at the anus, traveling through the anal canal, rectum, sigmoid, descending colon and splenic flexure to the transverse colon, all images having been obtained from a normal study. At the user's request, a segment of the transverse colon is replaced, by seamless fusion, with the corresponding location from a pathological examination of a polyp in the colon wall. In preferred embodiments, multiple alternative pathological samples are available for viewing and the user may select a specific macroscopic type (sessile, pedunculated etc.) and may magnify the structure by selecting a specific histological type such as tubular adenoma, villous, or tubulovillous.

Figure 2:
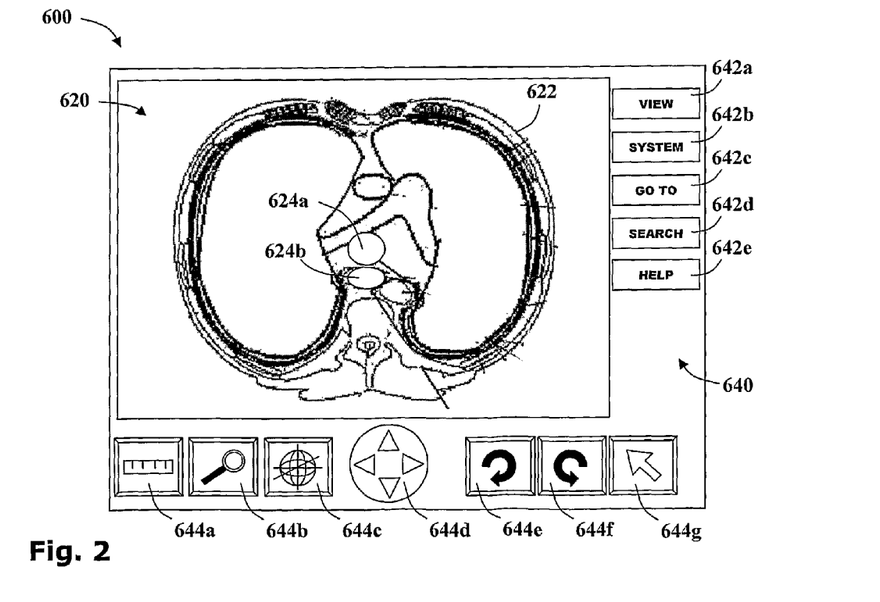
FIG. 2 is a schematic representation of a visual display presenting a view of the anatomical model to a user according to another embodiment of the invention.

Referring now to FIG. 2, a schematic representation of the visual display of an embodiment of the invention is shown in more detail, according to another embodiment of the invention. A graphical user interface (GUI) 600 displays a visual presentation 620 showing a view of the virtual model 59 (FIG. 1) and a control panel 640 for controlling the view.

The visual presentation 620 displays a visual representation 624, such as an endoscopic image, of an inner space superimposed upon a background image 622 providing its context. In the example shown in FIG. 2, endoscopic images 624a, 624b, for example showing the inside of the trachea 624a or the esophagus 624b, are fused, in their anatomical context, onto a (schematically represented) two-dimensional cross-section of a CT scan of the chest cavity. Preferably, three-dimensional perspective views may be provided as required.

The control panel 640 includes display controls 642 and navigation buttons 644. The display controls 642 allow a user to select the nature of the view displayed in the visual presentation 620. Examples of possible display controls 642 may include the following buttons:

A 'VIEW' button 642a for selecting the viewing mode, for example a user may select between models constructed from various non-invasive imaging techniques such as CT scans, MRI scans, Ultrasounds etc. The 'VIEW' button may determine the nature of the contextual image 622 displayed in the visual presentation 620a. Additionally, the 'VIEW' button may be used to select the nature of the fused image 624.

A 'SYSTEM' button 642b for selecting which organ system is displayed. A user may select to view for example the skeleton, cardiovascular system, gastrointestinal system, respiratory system, lymphatic system, combinations thereof or the like.

A 'GO TO' button 642c for a user to select a specific location within the body to view.

A 'SEARCH' button 642d for a user to enter a search term for searching the database 40 (FIG. 1).

A 'HELP' button 642e for providing a user with assistance when required.

In addition to the display controls 642, various navigation buttons 644 are provided to allow a user to manipulate the visual presentation 620 so as to navigate a virtual journey. Amongst others, navigation buttons 644 include the following.

A ruler tool 644a for measuring distances within the visual representation 620.

A zoom button 644b for zooming into or out of the visual representation 620.

A view-angle button 644c for varying the viewing angle.

Multiple direction arrows 644d for moving around the visual representation 620, preferably in three dimensions.

A rotate clockwise button 644e and a rotate anticlockwise button 644f.

A selection button 644g for selecting a desired area within the visual representation 620.

The example presented in FIG. 2 is for explanatory purposes only, other designs, display controls 642 and navigation buttons 644 will occur to programmers and GUI designers familiar with the invention.

In another embodiment, the visual display 620 may exhibit a passage along a pathway within a body by displaying a view of the corresponding pathway within the virtual model 59. A video stream of images obtained using, for example, an endoscopic technique may be included in the virtual model 59 and superimposed upon the three dimensional framework 54 in its anatomical context within the pathway. It is noted that the anatomical context of the features shown in the video stream is clearly indicated to the user by the displayed framework extending beyond the superimposed image. It is further noted that the user may be provided with a user interface 640 with controls for manipulating the view of the model for example by changing the viewing angle, zooming, rendering certain tissues transparent or the like. Thus, for example, a joystick could be used to rotate or tilt the image displayed to show the virtual object depicted from a different viewing angle, for example. The user interface 640 may also provide controls for animating the model to show how features thereof interact with each other when, for example a joint bends, a muscle contracts, an organ functions or the like.

It is noted that the superimposed image may itself be user controlled. In some embodiments the database contains more than one visual representation corresponding to the same location within the virtual model, such as still photographs, videos, histological sections etc. of the same feature. A user selects an image to represent that location. Such an embodiment may be used to illustrate how the same piece of anatomy may appear using various imaging techniques and under various magnifications.

It is noted that, optionally, a user may search for an appropriate visual representation from a database of images 40, using a search engine 44. The user can also choose to display only selected body systems such as the skeleton, muscle, blood or lymphatic systems, gastrointestinal system, nervous, genito-urinary system and so on using the user interface, for example by clicking a button, choosing from a menu or the like.

Optimally, each file 42n is labelled such that it can replace other files correlating to the same location or the same set of voxels. The file may carry descriptors regarding the location and medical state of the features represented and regarding the technique used to obtain the image. In this way the user could navigate within models of both healthy and diseased tissues or to simulate physiologic function or dysfunction in an interactive way as required, using a library of real medical studies, for example. Preferably, a 'virtual magnifying' function allows a user to view the model at multiple magnifications with each point of a virtual organ displayed at a macrolevel being linked to microscopic representations and data concerning the tissue, such as histology and pathology studies thereof, electronic microscopy images, cellular biology images using staining for features of intracellular structure such as the nucleus, mitochondria, gene studies etc. Further links may be provided to relevant sources of information, including external databases and the like.

In a preferred embodiment, multiple visual representations of a common location within the virtual model are used to represent the location as it would appear in various medical states, such as physiological conditions. For example a photographic and/or video image of a stomach wall of a healthy subject may be replaceable with a similar image from a corresponding position within the stomach of an ulcer sufferer. Furthermore, time sequence scans using multiple images within a single model may be used to represent the function of body systems, the progress of a disease or the effects of aging.

Metamorphosis imaging may be used to represent human or animal development during the embryonic stage and from birth to elderly. Using many imaging studies a model may be used to illustrate the physical changes in the life cycle. Metamorphosis imaging may also be used to illustrate the evolution from one cell to human body in a single interactive sequence using microscopic pictures, as well as various imaging techniques.

Optionally, the database 40 may include data files demonstrating the performance of various medical procedures such as an angioplasty, keyhole surgery, full surgery or the like. In other embodiments the virtual model may be used to present visual images of a patient in real-time during a medical procedure.

Figure 3:
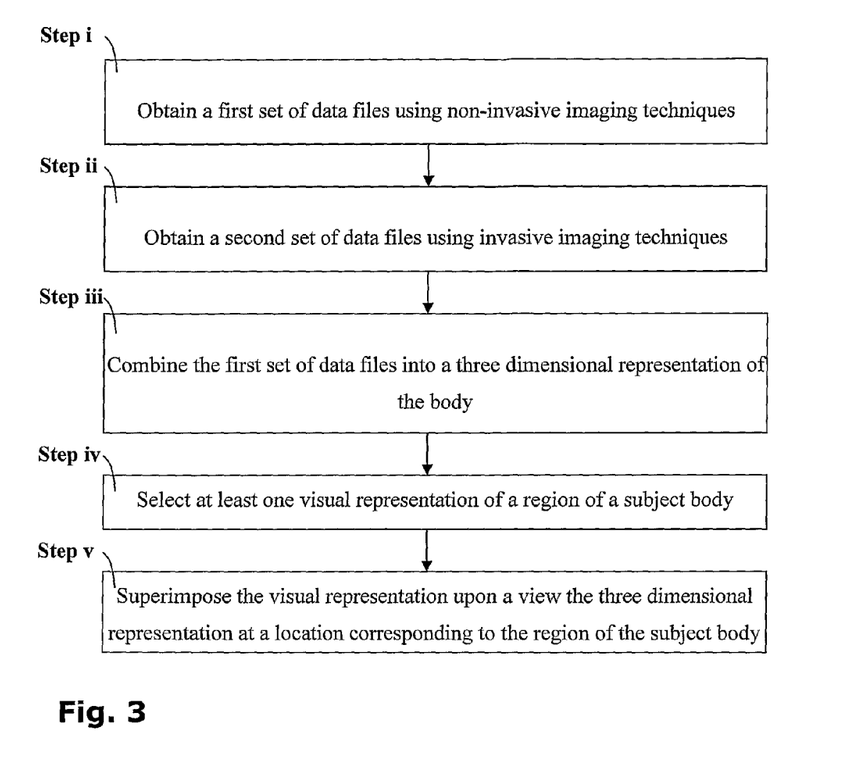
FIG. 3 is a flowchart representing a method for producing a virtual anatomical model according to a further embodiment of the current invention.

Referring to FIG. 3, a flowchart is presented that illustrates one method for producing a virtual anatomical model according to a specific embodiment of the current invention. The method consists of the following steps:

i. obtaining a first set of data files using non-invasive imaging techniques;

ii. obtaining a second set of data files using invasive imaging techniques;

iii. combining the first set of data files into a three dimensional representation of the body;

iv. selecting at least one visual representation of a region of a subject body, and v. superimposing the visual representation upon a view the three dimensional representation at a location corresponding to the region of the subject body.

According to a further embodiment, while the user navigates within the virtual model, a sequence of images, drawn from multiple data files, are superimposed upon the virtual model in a largely seamless fashion. A method is used for merging two or more image sequences from separate data files within a library of image sequences. Each image sequence in the library depicts movement in a three dimensional space, such as an anatomical subject, for example.

During display of an image sequence, the user is informed when an image from the sequence is displayed showing a view of the 3D space that also appears in one or more of the other image sequences in the library. The user is also provided with a description of each of the other sequences in the library having a frame depicting the same view as that currently displayed. The user is then queried as to whether he wishes to continue to view the sequence currently displayed or whether he wishes to discontinue the current image sequence and resume the navigation with a different sequence from the list.

The user selects an image sequence (either the current sequence or a sequence from the list) with which he wishes to continue the navigation through the 3D space. The navigation then continues starting from the frame in the selected sequence showing the same view of the 3D space as the currently displayed image. Because the frame at which the selection is made displays a similar view in both first and second image sequences, when a user decides to transfer from a first image sequence to a second sequence, the last view shown in the first sequence is the same as the first view in the second sequence. In this way the first and second sequences become merged in an essentially seamless manner.

Figure 4:
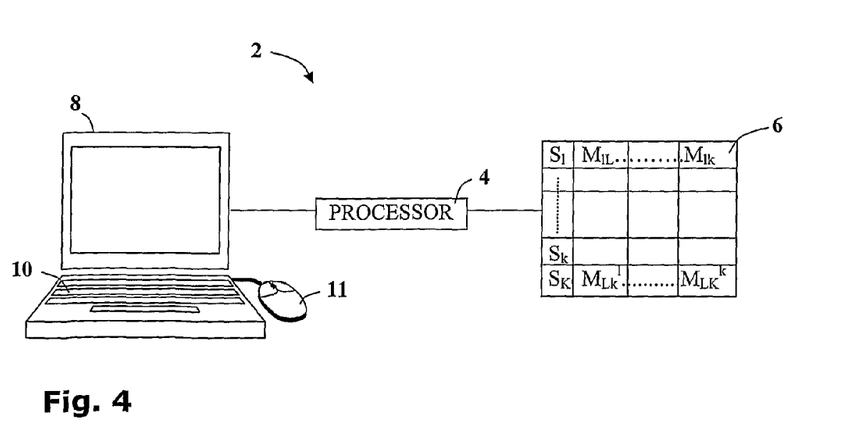
FIG. 4 shows a system for a user to navigate apparently seamlessly within the virtual model according to still a further embodiment of the invention.

In another aspect, a system is provided for carrying out the method of the invention in accordance with an embodiment of this aspect of the invention. FIG. 4 shows a system 2 in accordance with an embodiment of this aspect of the invention. The system 2 comprises a processor 4 coupled to a memory 6 and a display device 8. The display device 8 may, for example, be a CRT. A user input device, such as a keyboard 10 or computer mouse 11 allows a user to input data to the processor, as explained below. The system 2 may be implemented on a personal computer configured to execute the method of the invention.

The memory 6 stores image sequences $S_k$, k=1 to K, where K is the number of stored images sequences and is an integer greater than or equal to 2. For each image sequence $S_k$ and for each image $I_{lk}$ in the sequence $S_k$ (l=1 to $L_k$, where $L_k$ is the number of images in the image sequence $S_k$) the memory 6 stores a matrix $M_{lk}$, where having entries $M_{lk}^{ij}$, where $M_{lk}^{ij}=1$ if the view of the 3D space of the image $I_{lk}$ is the same as the view of the image $I_{ij}$, where $I_{ij}$ is the image i in the image sequence $S_j$. Otherwise, $M_{lk}^{ij}=0$. When $M_{lk}^{ij}=1$, the image sequence $S_k$ may be viewed up to the image $I_{lk}$, and the navigation continued with the image sequence $S_j$, starting with the image $I_{ij}$ of the sequence $S_j$. Passing from the sequence $S_k$ to the sequence Sj will appear seamless, since the view of the last imaged displayed in $S_k$ ($I_{lk}$) is the same as the view of the first imaged displayed in $S_j$. It should be noted that $M_{lk}^{ij}=1$.

In another aspect of the invention, there is provided an algorithm for displaying image sequences on a visual display unit, such as a computer screen 8.

Figure 5:
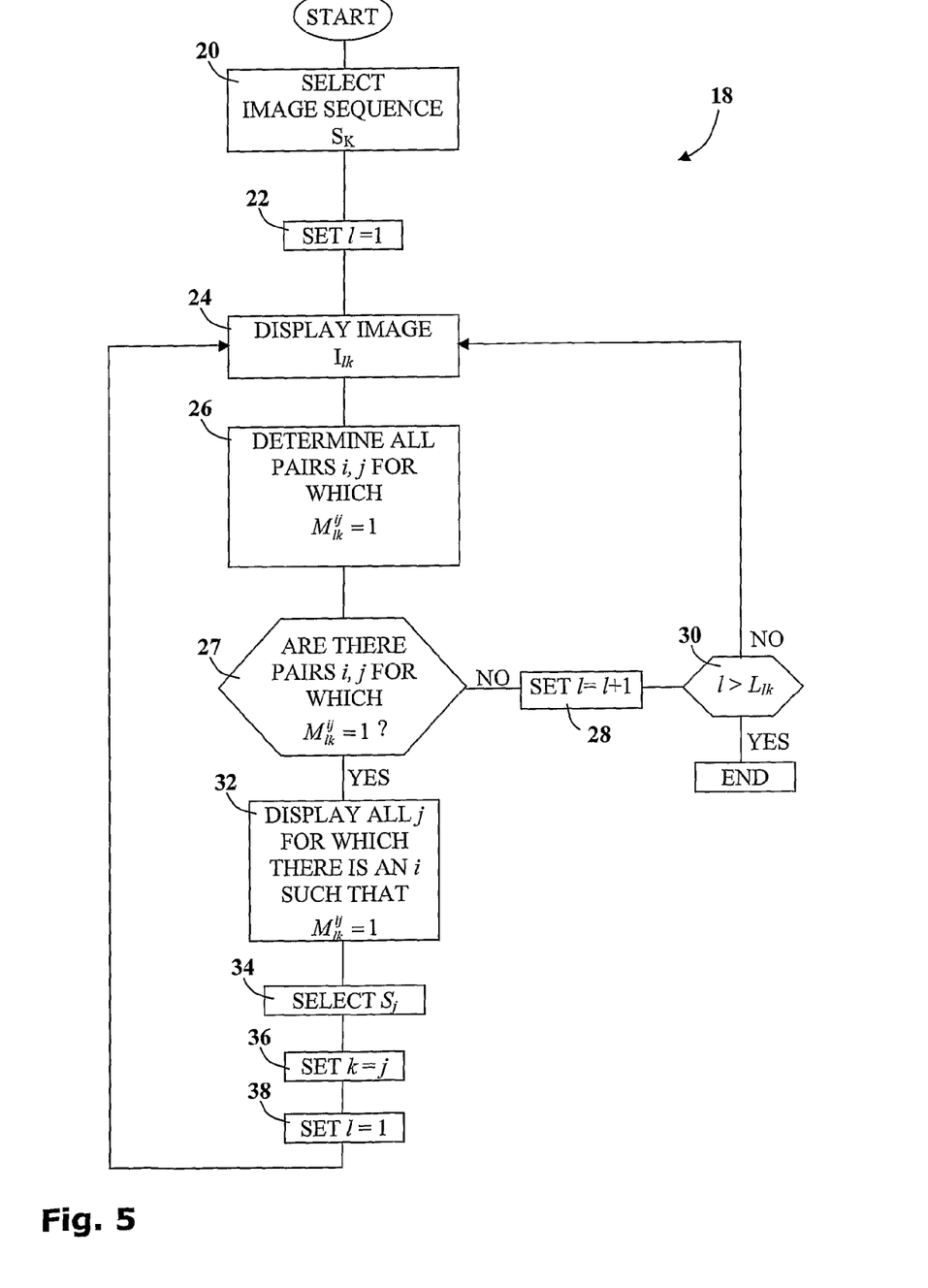
FIG. 5 is a flowchart representing a method for navigating within a virtual anatomical model in a seamless fashion according to another embodiment of the invention.

With reference to FIG. 5, a flowchart 18 representing a method for navigating within a virtual anatomical model is shown. An algorithm is disclosed, executed by the processor 4 (FIG. 4), for displaying image sequences in accordance with another embodiment of the invention. The user selects an initial image sequence $S_k$ to be displayed on the screen 8 (step 20). The image index l is then set to 1 (step 22), and the image $I_{lk}$ is displayed on the screen 8. Whilst the image $I_{lk}$ is displayed, the processor 4 searches in the matrix $M_{lk}$ for entries $M_{lk}^{ij}=1$ (step 26). Then it determines (step 27) if there are any entries $M_{lk}^{ij}=1$. If there are no such entries, then (step 28) the image index l is increased by 1 and it determines whether l>$L_k$ (step 30). If the condition is fulfilled, then the last image in the sequence $S_k$ has been displayed and the algorithm terminates. If in step 30 it is determined that l≦$L_k$, then the process returns to step 24 with the new image $I_{lk}$ being displayed.

If (step 27) it was determined that there are pairs i,j for which $M_{lk}^{ij}=1$, then (step 32), the processor 4 displays on the screen 8 a list of all image sequences $S_j$ for which there is an i such that $M_{lk}^{ij}=1$. The processor 4 may also display a brief description of each image sequence in the list. Using the input device 10, the user selects (step 34) the image sequence $S_k$ with which the user wishes to continue the navigation. The sequence index k is then set to the selected i (step 36), and the image index l is set to j (step 38) and the process returns to step 24, with the new image $I_{lk}$ being displayed. Since new image $I_{lk}$ displayed typically has a similar view to the previously displayed image, the switch from the previous image sequence to the current image sequence may occur in a seamless fashion.

It will be appreciated that appropriate embodiments may be used to merge image sequences of any 3D space. In a preferred embodiment of the invention, the image sequences relate to navigation through the human body. Appropriate image sequences may be obtained by substantially any method for imaging internal body spaces, such as endoscopy (fiber optics), ultrasound, magnetic resonance imaging (MRI), isotope scan, angiography and other contrast medium methods, visual inspection of the body, such as ear nose and ophthalmic inspection using a video or still camera, or x-ray, tomography, isotope studies, photography of the skin, skin lesions and other tissue in the body.

By way of illustrative example, a first image sequence may show a voyage through the nose into the larynx, with an image then showing the epiglottis. The voyage could then enter the trachea, pass to the carina and then enter into the left bronchus. A second image sequence may begin through the mouth into the larynx, with an image then showing an epiglottis. At this point, the voyage of the second image sequence enters the esophagus and passes through the esophagus to the stomach. A user may begin a voyage with the first image sequence from the nose to the view of the epiglottis. When the view of the epiglottis is being displayed, the processor will inform the user that a similar view of the epiglottis is found in the second image sequence. The user may then choose to continue the journey from the epiglottis with either the first of second image sequences.

It will be appreciated that a sequence may be viewed in a forward or reverse direction, or in a fast-forward mode smooth or staggered. Typically the direction that a sequence is viewed may be changed at substantially any time and where appropriate images are available may move off in different directions. The memory 6 may also store images of tissues, such as images of histological sections of healthy and diseased tissues obtained by microphotography. Preferably, where desired, the user may request that a high resolution image be displayed. The high resolution image may be displayed alone, or together with a portion of an image from the image sequence being viewed.

A voyage navigated through the human body, as described hereinabove may be used in several situations. For example, it may be used to teach medical students, patients or even laymen about anatomy or the principle of a medical procedure. The image sequences may be obtained by several different imaging techniques. For example, an image obtained by endoscopy may switch to 2D or 3D images obtained by a CT scan in order to view structures beyond the confines of the lumen where the endoscope tip is located.

Preferably, an image obtained by invasive procedures such as endoscopy is represented together with an image obtained by non-invasive procedure such as CT scan, thereby providing a contextual 3D structure of the body at the given spot. The user may be able to vary the view angle of the structure by rotating the model in any direction or may even navigate through structure walls.

In the example above, navigation was via the nose. Other possible junction points, in addition to the larynx, include the pharynx which can lead to either the mouth, larynx or Eustachian tube. Another possible junction point in the body is the duodenum which can lead to the bile or pancreatic ducts or to the small intestine. The library may also include, for example, image sequences of the urological, vascular, or lymphatic systems of the body. The library may contain sequences of embryonic development. Image sequences may illustrate various pathologies such as ulcers, inflammations, fistula, tumors, and so on. The method and system of the invention may be used as an aid during a medical procedure, such as biopsy, laser treatment, and so on.

The merging of image sequences in accordance with embodiments of the invention may allow visualization of an organ system, where each organ is imaged by a different technique. The library 40 (FIG. 1) preferably contains at least a sufficient number of image sequences so that all organs and organ systems are present in at least one of the sequences. The entire body can then be reconstructed in 3D from the composite of the sequences. A path joining any two locations in the body can be found by appropriate selection of sequences.

Embodiments of the invention may be implemented using cyclic image sequences in which the last image in a sequence is the same as the first image of the sequence. Such an image sequence may depict, for example, breathing, a beating heart, blood flow, swallowing and so on. The image sequences in the library are preferably synchronized in that at junctions the common view is shown in different sequences at the same stage in the cycle. As the user transfers from one sequence to another, a "living image" is created in which the image sequences are integrated into a single "functioning body". It will be appreciated that an animated virtual model may additionally demonstrate the function of various organs under different conditions, such as the heart, lung or muscle activity at rest or during exercise for example.

It will be further appreciated that although embodiments described hereinabove refer to a virtual anatomical model, alternative embodiments of the invention may provide virtual models of other three dimensional structures. For example, a virtual model may be constructed of an ants nest, sewage system, underground rail network or other network of concealed cavities. Images taken from within the cavities may be superimposed upon a virtual framework representing the network.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A virtual anatomical model comprising a virtual three dimensional framework representing an anatomical specimen and at least one visual representation of a region of a sample specimen; wherein said visual representation comprises data files obtained from imaging multiple subjects that are mosaiced said three dimensional framework at a location corresponding to said region of the sample specimen to present an integrated presentation of anatomical regions in their anatomical context.

2. The virtual model of claim 1 comprising a combination of at least a first set of data files obtained using non-invasive imaging techniques and a second set of data files obtained using invasive imaging techniques, wherein said first and said second data sets are merged side by side by mosaicing such that a single interactive model is created by combining different anatomical structures by the fusion or stitching of complementary images from various sources.

3. The virtual model of claim 2 wherein said non-invasive imaging technique is selected from a group comprising: external photography, x-ray, ultrasound, MRI, CT scanning, isotope study, echocardiography, positron emission tomography.

4. The virtual model of claim 2 wherein said invasive imaging technique is selected from a group comprising: endoscopic imaging, angiographic imaging, lymphangiographic imaging, and boreoscopic imaging.

5. The virtual model of claim 2 wherein said invasive imaging technique is selected from a group comprising: esophagogastroduodenoscopy, colonoscopy, proctosigmoidoscopy, endoscopic retrograde eholangiopancreatograpy, duodenoscope-assisted cholangiopancreatoscopy, intraoperative cholangioscopy, rhinoscopy, bronchoscopy, cystoscopy, colposcopy, hysteroscopy, falloscopy, laparoscopy, arthroscopy, thoracoscopy and mediastinoscopy, amnioscopy, fetoscopy, panendoscopy, laryngoscopy, esophagoscopy, and bronchoscopy.

6. The virtual model of claim 1, said region of the sample specimen being a wall of a cavity, the cavity being selected from a group comprising: physiological cavities, pathologic cavities, airways, blood-vessels, intestines, esophagus, stomach, heart, lymphatic system, genitourinary system, fistula, abscess and surgical incisions.

7. The virtual model of claim 1, comprising a plurality of visual representations corresponding to a common location within said three dimensional framework.

8. The virtual model of claim 7, wherein said plurality of visual representations represent the common location as it would appear in a plurality of medical states.

9. The virtual model of claim 1 wherein said visual representations are selected from the group comprising: still photographs, videos, histological sections, electron microscopic images and cellular biology imaging.

10. The virtual model of claim 1 wherein said virtual three dimensional framework comprises a mosaic of images obtained from a plurality of subjects.

11. The virtual model of claim 1 said virtual three dimensional framework being a true representation of a single sample specimen.

12. The virtual model of claim 1 wherein said specimen comprises a human body.

13. The virtual model of claim 1 further comprising a user interface for controlling a view angle of said virtual model.

14. The virtual model of claim 1 wherein said view simulates a passage along at least one pathway within said model.

15. The virtual model of claim 14 wherein said view comprises an endoscopic video stream superimposed upon said pathway.

16. The virtual model of claim 1 wherein said view comprises an animation of said model.

17. The virtual model of claim 1 wherein said three dimensional object is selected from the group consisting of: plants, animals, humans, anatomical specimens, buildings, tunnel systems, underground bunker networks, pipes, water works, sewage systems, nests, warrens, mechanical systems and vehicles.

18. A method for presenting a view of a virtual model of a three dimensional object using a system for presenting a view of a virtual model of a three dimensional object, said system comprising:

a. at least one database comprising a first set of data files representing an interior view of at least one specimen and a second set of data files representing an exterior view of at least one specimen;
b. a framework generator for constructing a virtual three dimensional framework from said second set of data files;
c. an image selector for selecting at least one said interior view;
d. a merger for combining at least one selected interior view with said three dimensional framework thereby producing said virtual model;
e. an output display for displaying said view of said virtual model, wherein the first set of data files comprises multiple image sequences, wherein switching from a first image sequence to a second image sequence occurs in a seamless fashion, said method comprising the steps:

(i) setting an image index l to 1;
(ii) displaying an image $I_{lk}$ of an image sequence Sk;
(iii) searching a matrix $M_{lk}$ for an entry for which $M_{lk}^{ij}=1$ indicating that a view of the 3D space of the image $I_{lk}$ is the same as the view of the image $I_{ij}$, where $I_{ij}$ in an image i in an image sequence $S_j$;
(iv) if there are no entries $M_{lk}^{ij}=1$, increasing the image index l by 1 either returning to step (ii) or terminating the process if $1 \geqq L_k$;
(v) if there are pairs i,j for which $M_{lk}^{ij}=1$, displaying a list of all image sequences $S_j$ for which there is a $_i$ such that $M_{lk}^{ij}=1$;
(vi) selecting an image sequence $S_j$ with which to continue the method;
(vii) setting the sequence index k to the selected j, and
(vii) setting the image index l to i and returning to step (ii).

* * * * *